US010112653B2

(12) United States Patent
Abe

(10) Patent No.: US 10,112,653 B2
(45) Date of Patent: Oct. 30, 2018

(54) VEHICLE LOWER STRUCTURE

(71) Applicant: HONDA MOTOR CO., LTD., Tokyo (JP)

(72) Inventor: Yuya Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 80 days.

(21) Appl. No.: 15/294,240

(22) Filed: Oct. 14, 2016

(65) Prior Publication Data

US 2017/0106914 A1  Apr. 20, 2017

(30) Foreign Application Priority Data

Oct. 19, 2015  (JP) .................. 2015-205501

(51) Int. Cl.
*B62D 21/15* (2006.01)
*B62D 25/02* (2006.01)
*B62D 25/20* (2006.01)

(52) U.S. Cl.
CPC ......... *B62D 21/157* (2013.01); *B62D 21/152* (2013.01); *B62D 25/025* (2013.01); *B62D 25/2018* (2013.01); *B62D 25/2027* (2013.01); *B62D 25/2036* (2013.01)

(58) Field of Classification Search
CPC ................ B62D 21/157; B62D 25/025; B62D 25/2036; B62D 25/2027; B62D 25/2018
USPC .......... 296/209, 204, 203.01, 203.02, 203.03
See application file for complete search history.

(56) References Cited

U.S. PATENT DOCUMENTS

| | | | | |
|---|---|---|---|---|
| 2009/0243343 | A1* | 10/2009 | Tamakoshi | B62D 25/04 296/204 |
| 2012/0256448 | A1* | 10/2012 | Yasui | B62D 21/152 296/209 |
| 2013/0257097 | A1* | 10/2013 | Kojo | B62D 21/15 296/187.08 |
| 2015/0008703 | A1* | 1/2015 | Furusaki | B62D 21/152 296/187.08 |

FOREIGN PATENT DOCUMENTS

| | | |
|---|---|---|
| JP | 2007-125974 A | 5/2007 |
| JP | 2013-63758 A | 4/2013 |
| JP | 2013-113166 A | 6/2013 |
| JP | 5670246 B2 | 2/2015 |

OTHER PUBLICATIONS

Office Action dated Aug. 10, 2017, issued in counterpart Japanese Application No. 2015-205501, with English translation (6 pages).

* cited by examiner

*Primary Examiner* — Jason S Morrow
*Assistant Examiner* — E Turner Hicks
(74) *Attorney, Agent, or Firm* — Westerman, Hattori, Daniels & Adrian, LLP

(57) ABSTRACT

A vehicle lower structure includes a front side frame coupled to a floor frame, and an outrigger extending outward in the vehicle-width direction from the front side frame to a side sill. A reinforcing member extends obliquely rearward in the vehicle-width direction from the side sill to the front side frame. The reinforcing member has a curved portion curved upward in the middle thereof and is formed substantially in a V shape.

13 Claims, 9 Drawing Sheets

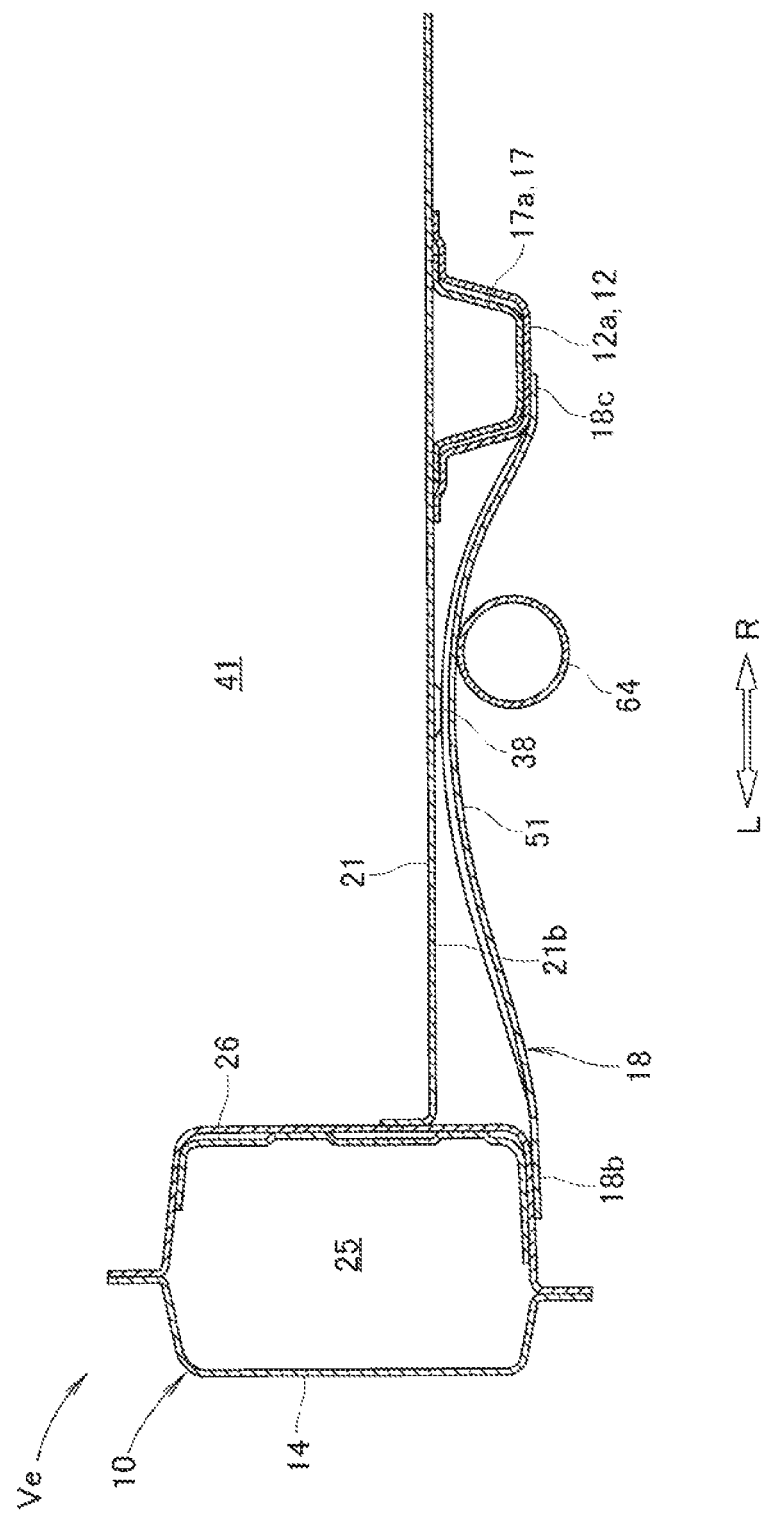

VEHICLE LOWER STRUCTURE

CROSS REFERENCES TO RELATED APPLICATIONS

The present application claims priority wider 35 U.S.C. § 119 to Japanese Patent Application No. 2015-205501, filed Oct. 19, 2015, entitled "Vehicle Lower Structure." The contents of this application are incorporated herein by reference in their entirety.

TECHNICAL FIELD

The present disclosure relates to a vehicle lower structure in which an outrigger extends from a front side frame to a side sill and in which a floor frame is coupled to the front side frame.

BACKGROUND

There is known a vehicle lower structure in which a bulkhead is provided inside a side sill and in which a reinforcing member extends rearward from the side sill having the bulkhead thereinside to a floor frame on the inner side in the vehicle-width direction. Joining the reinforcing member to a floor results in the creation of a closed section by the reinforcing member and the floor, which enhances the strength and rigidity of the reinforcing member.

In the event of a narrow offset crash, a front wheel moves rearward and comes into contact, with a front end of the side sill, causing an impact load to be applied to the side sill. At this time, the impact load can be supported by the reinforcing member. Supporting the impact load by the reinforcing member reduces or eliminates a rearward movement of a front pillar. This prevents the front pillar from coming into contact with a side door, thereby eliminating the difficulty of opening the side door (see, for example, Japanese Patent No. 5670246).

In the vehicle lower structure disclosed in Japanese Patent No. 5670246, a highly strong and rigid reinforcing member extends rearward from a side sill to a floor frame on the inner side in the vehicle-width direction. With this arrangement, when the side sill is subjected to an impact load toward the inner side along the vehicle-width direction in the event of a side-impact crash, the impact load is transmitted through the reinforcing member to the floor frame. When subjected to the transmitted impact load, the floor frame is deformed toward the inner side in the vehicle-width direction, interfering with in-vehicle parts and components disposed on the inner side in the vehicle-width direction.

SUMMARY

For example, the present application describes a vehicle lower structure that eliminates the difficulty of opening a side door in the event of a narrow offset crash and prevents damage to in-vehicle parts and components resulting from a side impact.

A first aspect of the present application provides a vehicle lower structure in which a rear end of a front side frame is joined to a front end of a floor frame and in which an outrigger extends outward in the vehicle-width direction from the front side frame to a front end of a side sill, which includes a reinforcing member extending obliquely rearward in the vehicle-width direction from a junction area between the outrigger and the side sill to the front side frame, in which the reinforcing member has a curved portion curved upward or downward in the middle thereof and is formed substantially in a V shape.

As described above, the reinforcing member extends obliquely rearward in the vehicle-width direction from the junction area between the outrigger and the side sill to the floor frame. With this arrangement, an impact load approaching the side sill (from a front wheel) can be supported by the reinforcing member in the event of a narrow offset crash. This reduces or eliminates a rearward movement of the side sill together with a front pillar that is caused by the impact load, thereby eliminating the difficulty of opening and closing a side door. The narrow offset crash (in other words, a small overlap crash) refers to a crash in which the front corner that accounts for one quarter of the front of the vehicle strikes an object such as a tree or utility pole.

The reinforcing member has a curved portion curved upward or downward in the middle thereof and is formed substantially in a V shape (or a chevron shape). With this arrangement, when, in the event of a side impact, the side sill is subjected to an impact load coming into the inner side in the vehicle-width direction, the reinforcing member is deformed, thereby preventing the transmission of the impact load to the floor frame. This reduces or eliminates the deformation of the floor frame toward the inner side in the vehicle-width direction, thereby preventing damage to in-vehicle parts and components disposed on the inner side in the vehicle-width direction.

A second aspect of the present application provides a vehicle lower structure that preferably may include a front assembly including the front side frame and the outrigger and a floor assembly including the side sill, the floor frame, and a floor panel supported by the side sill and the floor frame, in which the reinforcing member may be joined to upper or lower surfaces of the front side frame and the outrigger of the front assembly and may be joined to upper or lower surfaces of the side sill and the floor panel.

As described above, the reinforcing member is joined to the upper or lower surfaces of the front side frame and the outrigger of the front assembly. In other words, the reinforcing member can be joined to the front assembly. With this arrangement, when the front assembly is integrated with the floor assembly, the reinforcing member, together with the front assembly, can be installed on the floor assembly. This eliminates the need for a process in which the reinforcing member alone is installed on the floor assembly, thereby simplifying an assembly process for the vehicle lower structure.

A third aspect of the present application provides a vehicle lower structure in which preferably the reinforcing member may have a leading edge located toward the front of the vehicle and a trailing edge located toward the rear of a vehicle and in which the leading edge of the reinforcing member may be inclined to the front of the vehicle to a greater degree than the trailing edge.

As described above, the leading edge of the reinforcing member may be inclined to the front of the vehicle to a greater degree than the trailing edge. This arrangement enhances the strength and rigidity of the reinforcing member to resist the impact load applied to the side sill (through the front wheel) in the event of a narrow offset crash. This enables the reinforcing member to support the impact load applied to the side sill in a more preferred manner.

A fourth aspect of the present application provides a vehicle lower structure in which an outer end of the reinforcing member may preferably be located close to a junction area between an outer end of the outrigger and the floor panel and in which an opening may be formed on the side of the outer end of the reinforcing member.

As described above, the outer end of the reinforcing member is located close to a junction area between the outer end of the outrigger and the floor panel. In addition, an opening is formed on the side of the outer end of the reinforcing member. With this arrangement, a welding electrode for spot welding inserted through the opening can be used to join the junction area between the outer end of the outrigger and the floor panel by means of spot welding. The outer end of the outrigger is joined to the side sill. This ensures that the outer end of the outrigger and the floor panel are tightly joined to each other in the vicinity of the side sill, thereby enhancing the so-called joint strength.

A fifth aspect of the present application provides a vehicle lower structure in which a stiffener for reinforcement may preferably be provided inside the side sill and in which the reinforcing member may have a projecting portion projecting to an area of the side sill located to the rear of the outrigger.

As described above, the stiffener for reinforcement is provided inside the side sill. In addition, the projecting portion is formed in the reinforcing member so as to project to an area of the side sill located to the rear of the outrigger. With this arrangement, the projecting portion the side sill, and the stiffener can be overlapped one another. In other words, three components including the projecting portion, the side sill, and the stiffener can be overlapped and joined to one another by means of spot welding. This ensures that the reinforcing member is tightly joined to the side sill, thereby enhancing the so-called joint strength of the reinforcing member.

A sixth aspect of the present application provides a vehicle lower structure in which preferably the floor panel may include a planar flat portion, a slanted portion located adjacent to at least one of front and rear ends thereof, a folded portion provided at the boundary between the flat portion and the slanted portion, and a seat portion that projects from the folded portion and to which the reinforcing member can be joined.

As described above, a planar flat portion and a slanted portion are formed in the floor panel. In addition, a folded portion is provided at the boundary between the flat portion and the slanted portion, and a seat portion is provided so as to project from the folded portion. This enables the reinforcing member disposed on the floor panel to be joined to the seat portion. In other words, this arrangement enables the reinforcing member to be joined to the intricately shaped floor panel having the flat portion and the slanted portion. This enhances design freedom in determining the shape of the floor panel.

A seventh aspect of the present application provides a vehicle lower structure in which the reinforcing member may preferably be disposed on a lower surface of the floor panel and the curved portion is curved upward and a pipe is mounted on the curved portion.

As described above, the reinforcing member is disposed on a lower surface of the floor panel and the curved portion is curved upward. In addition, an exhaust pipe or other pipe is mounted on the curved portion. This arrangement allows the exhaust pipe or the pipe to be located closer to the floor panel. This enables the exhaust pipe or other pipe to be disposed at a higher position, contributing to a reduction of the minimum ground clearance of the vehicle.

BRIEF DESCRIPTION OF THE DRAWINGS

The advantages of this disclosure will become apparent in the following description taken in conjunction with the following diagrams.

FIG. 9 is a sectional view taken along line IX-IX of FIG. 8.

DETAILED DESCRIPTION

Figure 1:
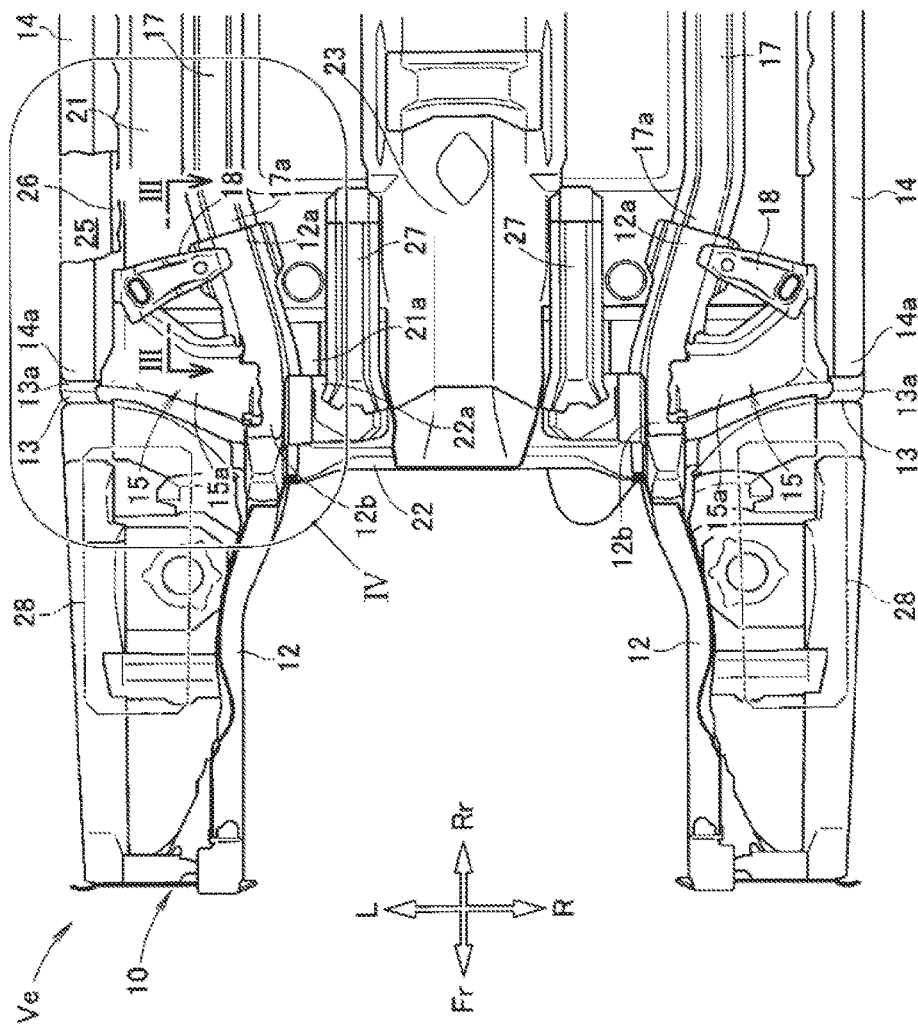
FIG. 1 is a bottom view of a vehicle lower structure according to an embodiment of the present application.

A preferred embodiment of the present application will be described below with reference to the attached drawings. In this description, references to "front (Fr)", "rear (Rr)", "right (R)", and "left (L)" are relative to the operator's position in the driver's seat of a vehicle.

A vehicle lower structure 10 according to the embodiment will be described below. The vehicle lower structure 10 exhibits substantially bilateral symmetry. Accordingly, the same reference numerals and symbols are assigned to right-side and left-side components of the vehicle lower structure 10, and a detailed description of the left-side components is provided while a description of the right-hand components is omitted in this description.

As shown in FIG. 1, the vehicle lower structure 10 is a vehicle body part that constitutes a base structure of the vehicle Ve. The vehicle lower structure 10 includes a front side frame 12 extending in the longitudinal direction of the vehicle, a front pillar 13 provided on the outer side in the vehicle-width direction of the front side frame 12, a side sill 14 extending rearward from a lower end 13a of the front pillar 13, and an outrigger 15 extending outward in the vehicle-width direction from the front side frame 12 to the side sill 14.

In addition, the vehicle lower structure 10 includes a floor frame 17 extending rearward from a rear end 12a of the front side frame 12, a reinforcing member 18 placed so as to provide a direct connection between the floor frame 17 and the outrigger 15, and a floor panel 21 supported by the side sill 14 and the floor frame 17.

The front side frame 12 has its portion 12b around the longitudinal center thereof joined to a lower surface of a lower dashboard 22 from below and has the rear end 12a thereof joined to a front end 17a of the floor frame 17 from below. The floor frame 17 is joined to the floor panel 21 from below. In addition, a front end 21a of the floor panel 21 is joined to a rear end 22a of the lower dashboard 22. Furthermore, a floor tunnel 23 is formed at the breadthwise center of the floor panel 21.

The rear end 12a of the front side frame 12 extends rearward to the front end 21a of the floor panel 21. In addition, the outrigger 15 extends outward in the vehicle-width direction from the portion 12b around the longitudinal center of the front side frame 12 to a front end 14a of the side sill 14. The front pillar 13 extends upward from the front end 14a of the side sill 14. An openable and closable side door (more specifically, a front side door) is mounted on the front pillar 13 so as to extend rearward.

A stiffener 26 (see FIG. 7) designed for reinforcement is provided in an inner portion 25 of the side sill 14. A front wheel 28 is located close to the front end 14a of the side sill 14 and a front end 15a of the outrigger 15. In addition, the front end 17a of the floor frame 17 is joined to the rear end 12a of the front, side frame 12. Furthermore, a reinforcing frame 27 is joined to an inner side in the vehicle-width direction of the front side frame 12.

Figure 2:
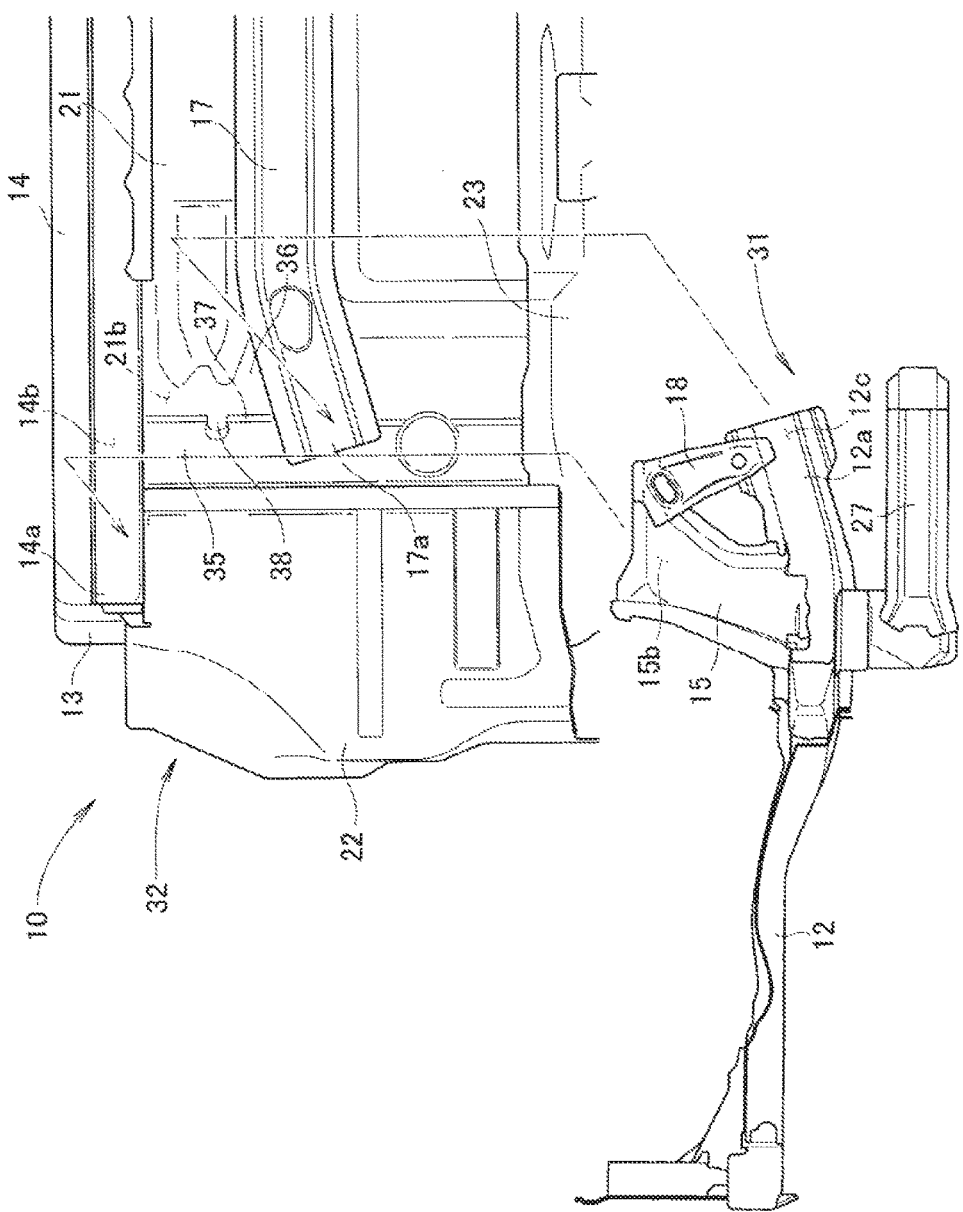
FIG. 2 is an exploded bottom view of a vehicle lover structure of FIG. 1.

As shown in FIG. 2, the front side frame 12, the outrigger 15, the reinforcing frame 27, and the reinforcing member 18 are integrally assembled so as to form a front assembly 31. The reinforcing member 18 is joined to a lower surface 12c of the front side frame 12 and a lower surface 15b (namely, part of the underside of the vehicle) of the outrigger 15.

In addition, the side sill 14, the floor frame 17, the floor panel 21, and the lower dashboard 22 are integrally assembled so as to form a floor assembly 32. The reinforcing member 18 is joined to a lower surface 14b of the side sill 14 and a lower surface 21b (namely, part of the underside of the vehicle) of the floor panel 21.

The floor assembly 32 is assembled in a main assembly line, while the front assembly 31 is assembled in a sub-assembly line. After being assembled in the sub-assembly line, the front assembly 31 is integrated with the floor assembly 32 in the main assembly line.

As described above, the reinforcing member 18 is installed on the front assembly 31 in the sub-assembly line. Accordingly, when the front assembly 31 is integrated with the floor assembly 32, the reinforcing member 18, together with the front assembly 31, can be installed on the floor assembly 32. This eliminates the need for a process in which the reinforcing member 18 alone is installed on the floor assembly 32, thereby simplifying an assembly process for the vehicle lower structure 10.

Figure 3:
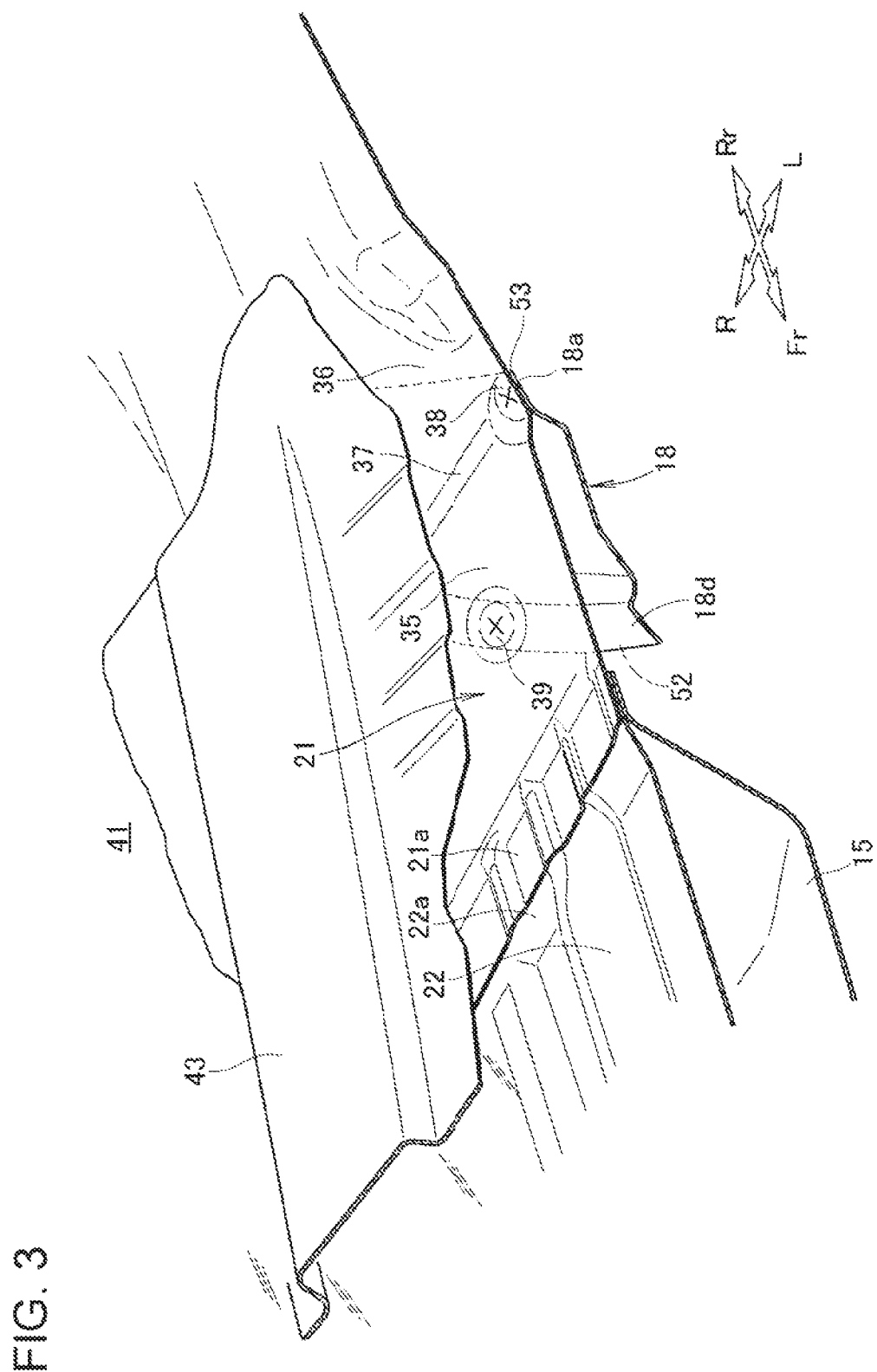
FIG. 3 is a perspective view of section taken along line III-III of FIG. 1.

As shown in FIG. 3, the floor panel 21 includes a planar flat portion 35, a slanted portion 36 that is located adjacent to a rear end of the flat portion 35 so as to extend rearward, a folded portion 37 provided at the boundary between the flat portion 35 and the slanted portion 36, and a seat portion 38 that projects from the folded portion 37 and to which the reinforcing member 18 can be joined. A reinforcing member 43 is joined to an upper surface 21c of the floor panel 21 from a passenger compartment 41.

The flat portion 35 and the slanted portion 36 both of which are formed in the floor panel 21 enable the floor panel to be formed in various shapes. In addition, the seat portion 38 projects downward from the folded portion 37, while the reinforcing member 18 is joined to the seat portion 38 from below. More specifically, the reinforcing member 18 is disposed on the lower surface 21b of the floor panel 21, while a center (namely the center of a curved portion 51 (see FIG. 4)) of a rear flange 18a of the reinforcing member 18 is joined to the seat portion 38 by means of spot welding. In other words, this arrangement enables the reinforcing member 18 to be joined to the intricately shaped floor panel 21 having the flat portion 35 and the slanted portion 36. This enhances design freedom when determining the shape of the floor panel 21.

In addition, like the center of the rear flange 18a of the reinforcing member 18, a center (namely, the center of the curved portion 51) of a front flange 18d of the reinforcing member 18 is joined to the seat portion 38 by means of spot welding. As described above, the centers of the rear flange 18a and the front flange 18d of the reinforcing member 18 are joined to the floor panel 21, thereby ensuring that the reinforcing member 18 is sufficiently strong and rigid.

Figure 4:
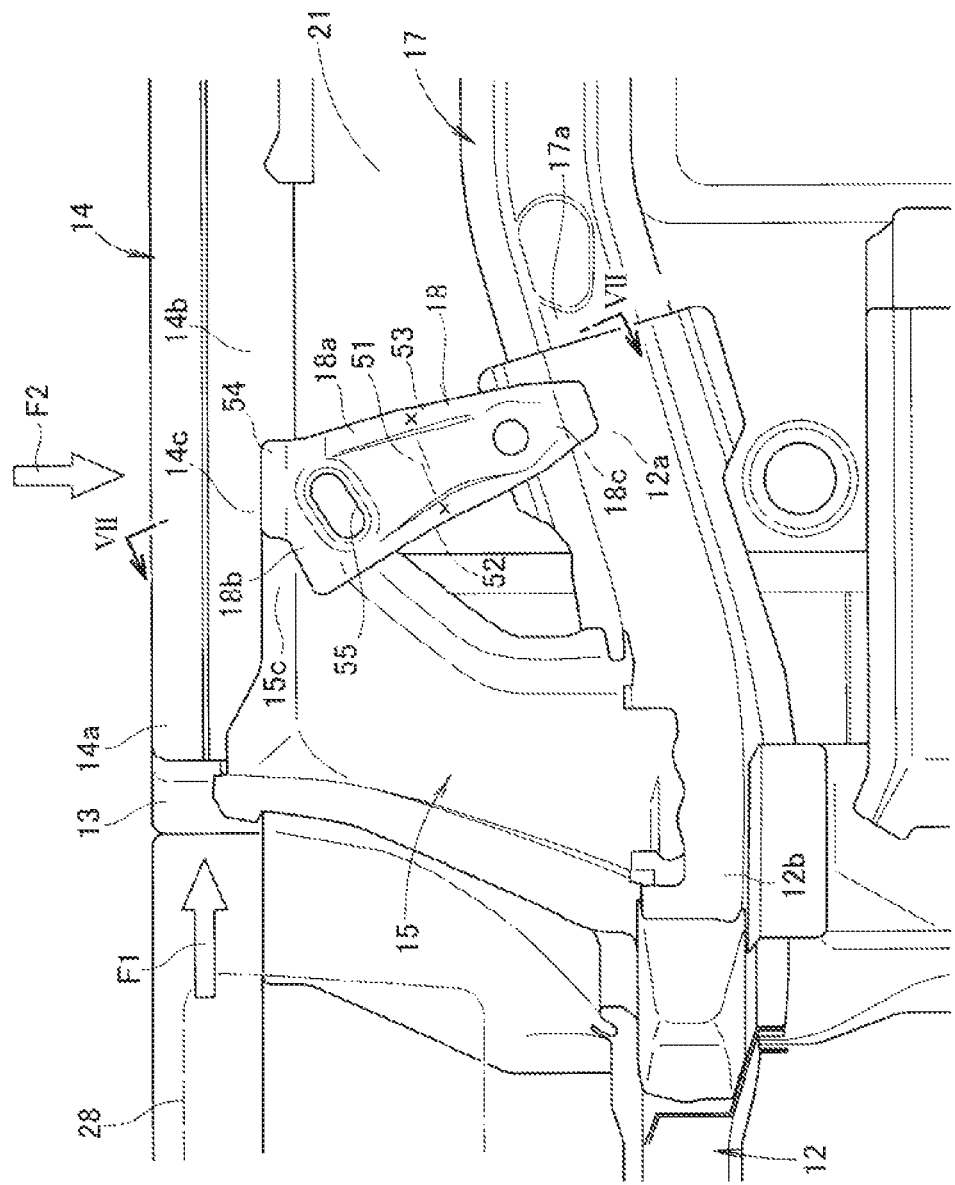
FIG. 4 is an enlarged view of part of a vehicle lower structure indicated by IV of FIG. 1.
Figure 5:
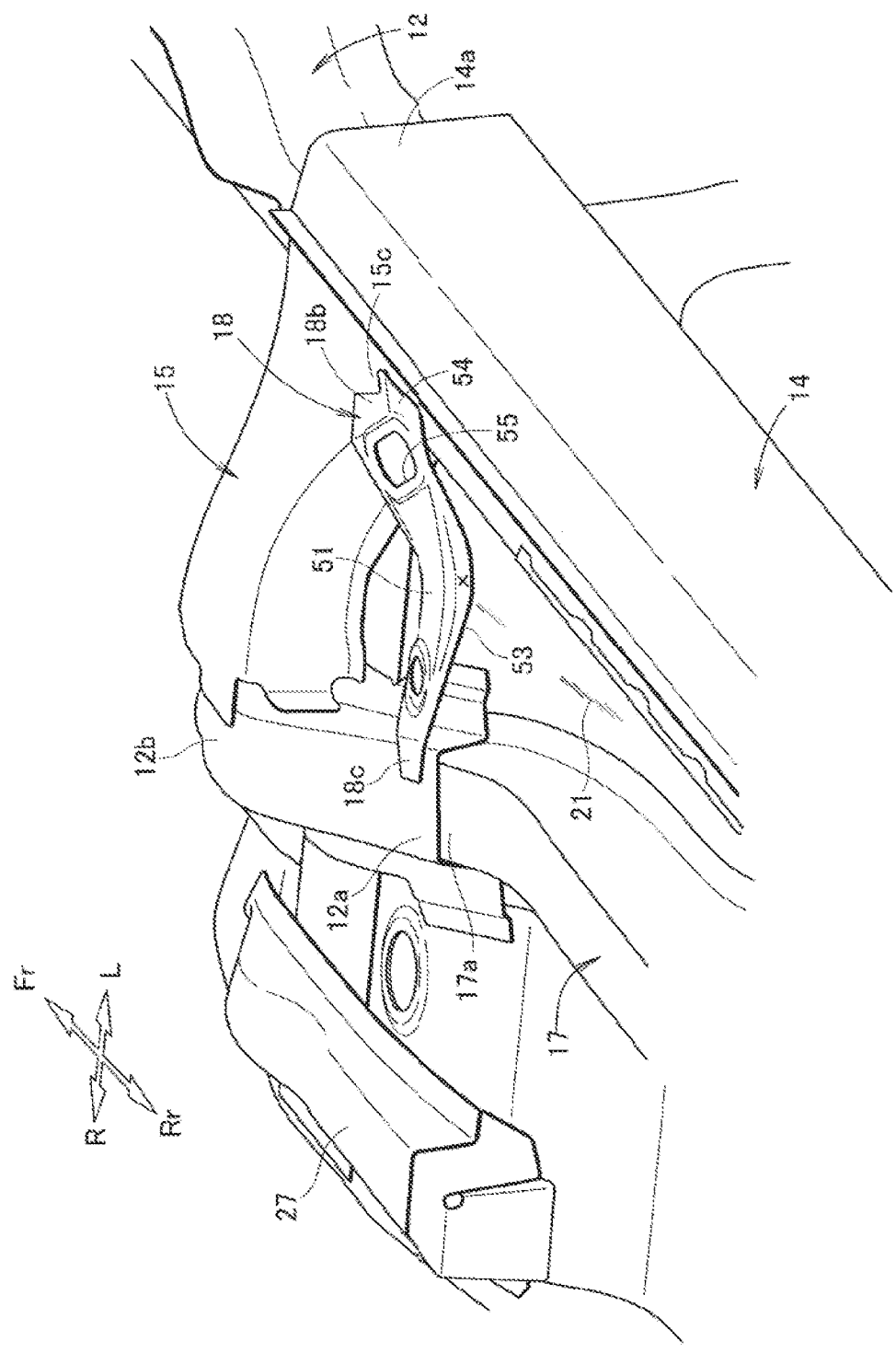
FIG. 5 is a perspective view of a vehicle lower structure of FIG. 4 as seen obliquely from the rear.

As shown in FIGS. 4 and 5, the reinforcing member 18 extends obliquely rearward in the vehicle-width direction from a junction area 14c of the side sill 14 to the floor frame 17. The junction area 14c of the side sill 14 is part of the lower surface 14b of the side sill 14 to which an outer end 15c of the outrigger 15 is connected.

An outer end 18b of the reinforcing member 18 is joined to the outer end 15c of the outrigger 15. In addition, an, inner end 18c of the reinforcing member 18 is joined to the rear end 12a of front side frame 12. The obliquely extending reinforcing member 18 enables the reinforcing member 18 to support an impact load F1 approaching the side sill 14 from the front wheel 28 in the event of a narrow offset crash.

This arrangement reduces or eliminate a rearward movement of the side sill 14 together with the front pillar 13 that is caused by the impact load F1. This prevents the front pillar 13 from coming into contact with the side door, thereby eliminating the difficulty of opening and closing the side door. The narrow offset crash (in other words, a small overlap crash) refers to a crash in which the front corner that accounts for one quarter of the front of the vehicle strikes an object such as a tree or utility pole.

The reinforcing member 18 includes a curved portion 51 whose middle portion is curved upward, a leading edge 52 located toward the front of the vehicle, a trailing edge 53 located rearward, a projecting portion 54 projecting rearward from the outer end 18b, and an opening 55 formed on the side of the outer end 18b.

Due to presence of the curved portion 51 in the middle of the reinforcing member 18, the reinforcing member 18 is formed substantially in a reversed V shape (or a chevron shape). With this arrangement, when, in the event of a side impact, the side sill 14 is subjected to an impact load F2 approaching the inner side in the vehicle-width direction, the reinforcing member 18 is deformed, thereby preventing the transmission of the impact load F2 to the floor frame 17. This reduces or eliminates the deformation of the floor frame 17 toward the inner side in the vehicle-width direction, thereby preventing damage to in-vehicle parts and components disposed on the inner side in the vehicle-width direction.

Figure 6:
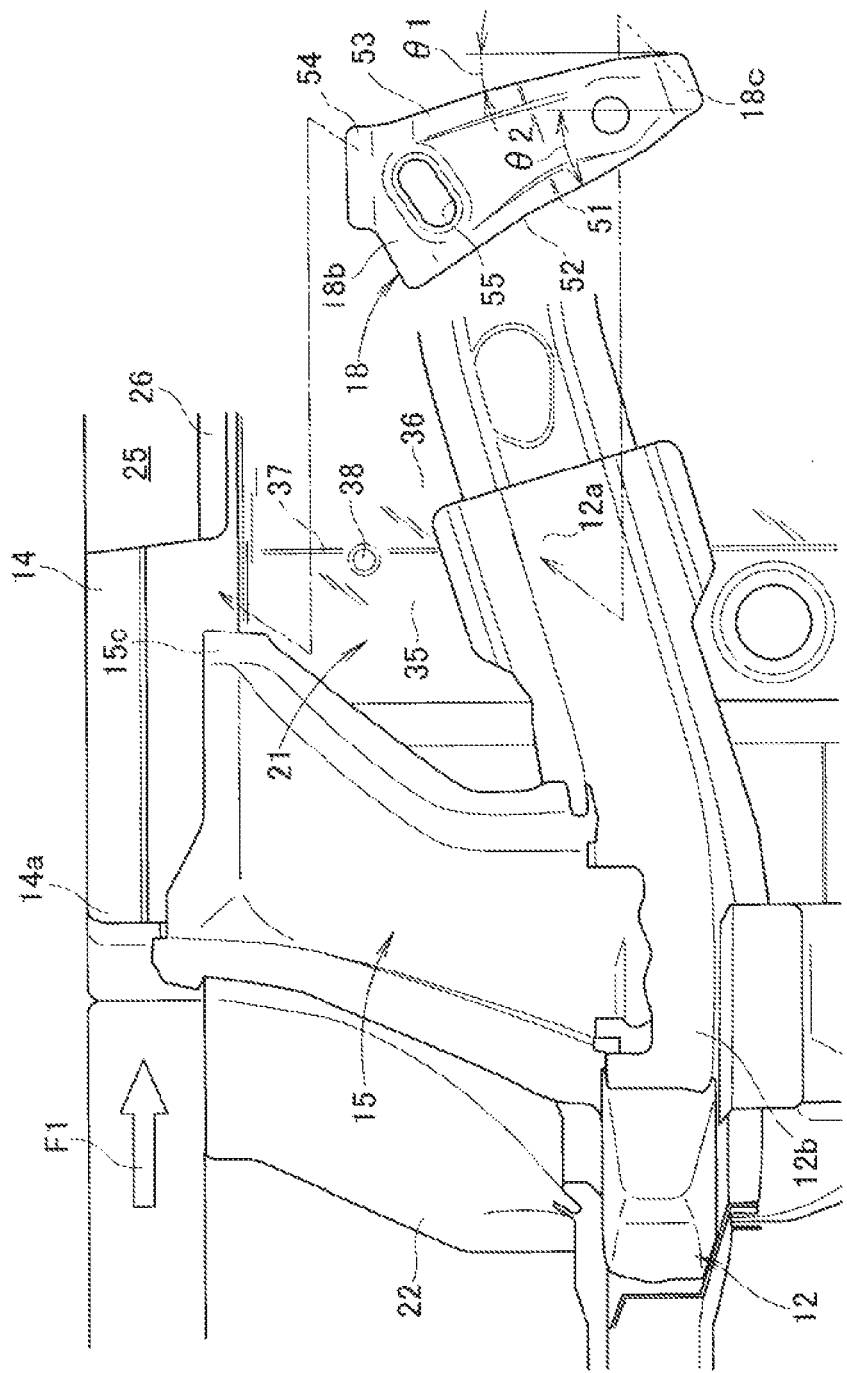
FIG. 6 is an exploded bottom view of a vehicle lower structure of FIG. 4.

As shown in FIG. 6, the reinforcing member 18 is formed in such a manner that the leading edge 52 is inclined toward the front of the vehicle to a greater degree than the trailing edge 53. In other words, an inclination angle θ21 of the leading edge 52 is greater than an inclination angle θ1 of the trailing edge 53. This arrangement enhances the strength and rigidity of the reinforcing member 18 to resist the impact load F1 applied to the side sill 14 (through the front wheel) in the event of a narrow offset crash. This enables the reinforcing member 18 to support the impact load F1 applied to the side sill 14 in a more preferred manner.

In addition, the projecting portion 54 projects rearward from the outer end 18b of the reinforcing member 18. The projecting portion 54 projects to an area of the side sill 14 located to the rear of the outer end 15c of the outrigger 15. The stiffener 26 for reinforcement is provided in the inner portion 25 of the side sill 14.

Figure 7:
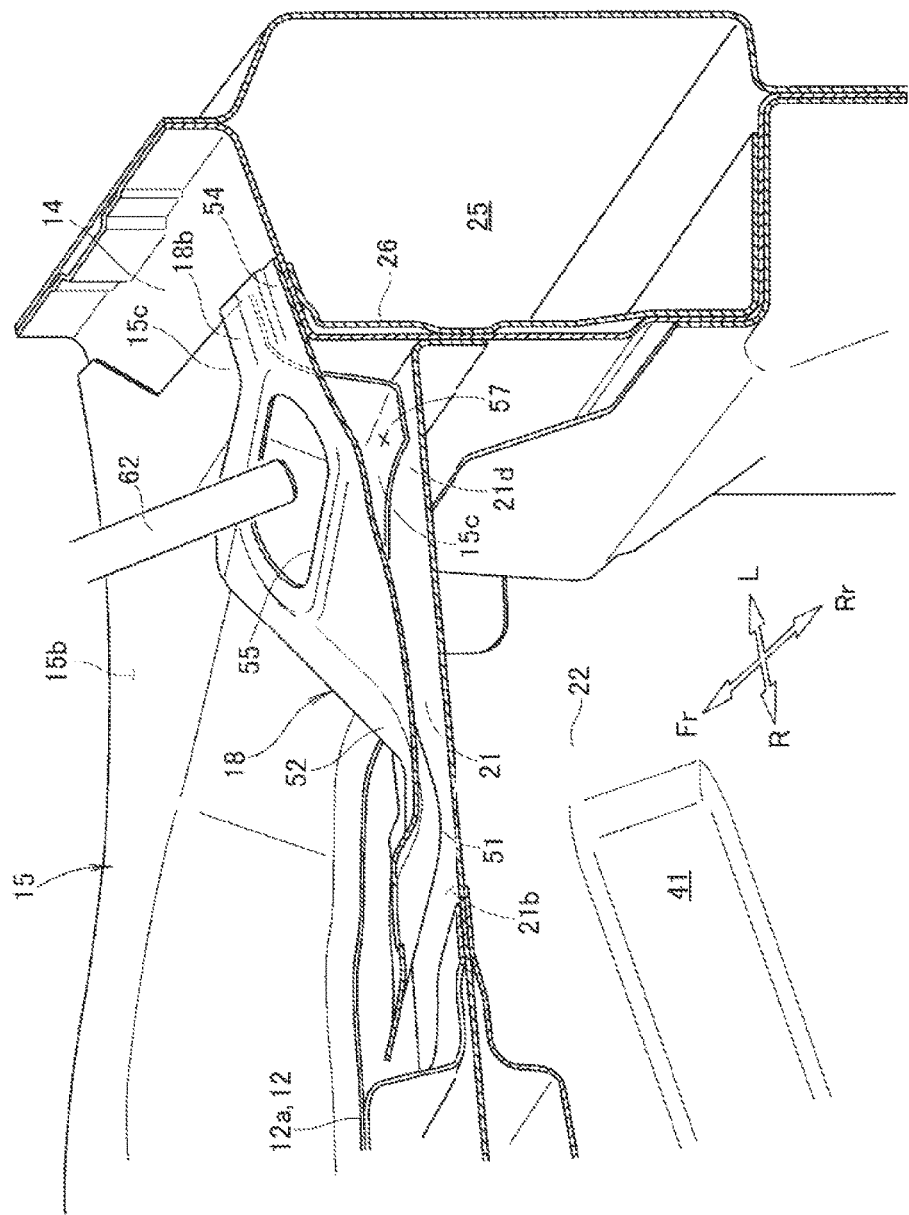
FIG. 7 is a sectional view taken along line VII-VII of FIG. 4.

As shown in FIG. 7, with this arrangement, the projecting portion 54, the side sill 14, and the stiffener 26 can be overlapped. In other words, three components including the projecting portion 54, the side sill 14, and the stiffener 26 can be overlapped and joined to one another by means of spot welding. This ensures that the reinforcing member 18 is tightly joined to the side sill 14, thereby enhancing the so-called joint strength of the reinforcing member 18.

The outer end 15b of the outrigger 15 and the outer end 21d of the floor panel 21 are joined to each other at a junction area 57. The outer end 18b of the reinforcing member 18 is located above and close to the junction area 57. In addition, the opening 55 is provided on the side of the outer end 18b of the reinforcing member 18. As a result of this, the opening 55 faces the junction area 57 in a space that, is located above and close to the junction area 57 on the inner side in the vehicle-width direction of the junction area 57.

With this arrangement, a welding electrode 62 for spot welding inserted through the opening 55 can be used to join the junction area 57 between the outer end 15c of the outrigger 15 and the outer end 21d of the floor panel 21 by means of spot welding. The outer end 15c of the outrigger 15 is joined to the side sill 14. This ensures that the outer end 15c of the outrigger 15 and the outer end 21d of the floor panel 21 are tightly joined to each other in the vicinity of the side sill 14, thereby enhancing the so-called joint strength of the outer end 15c and the outer end 21d.

Figure 8:
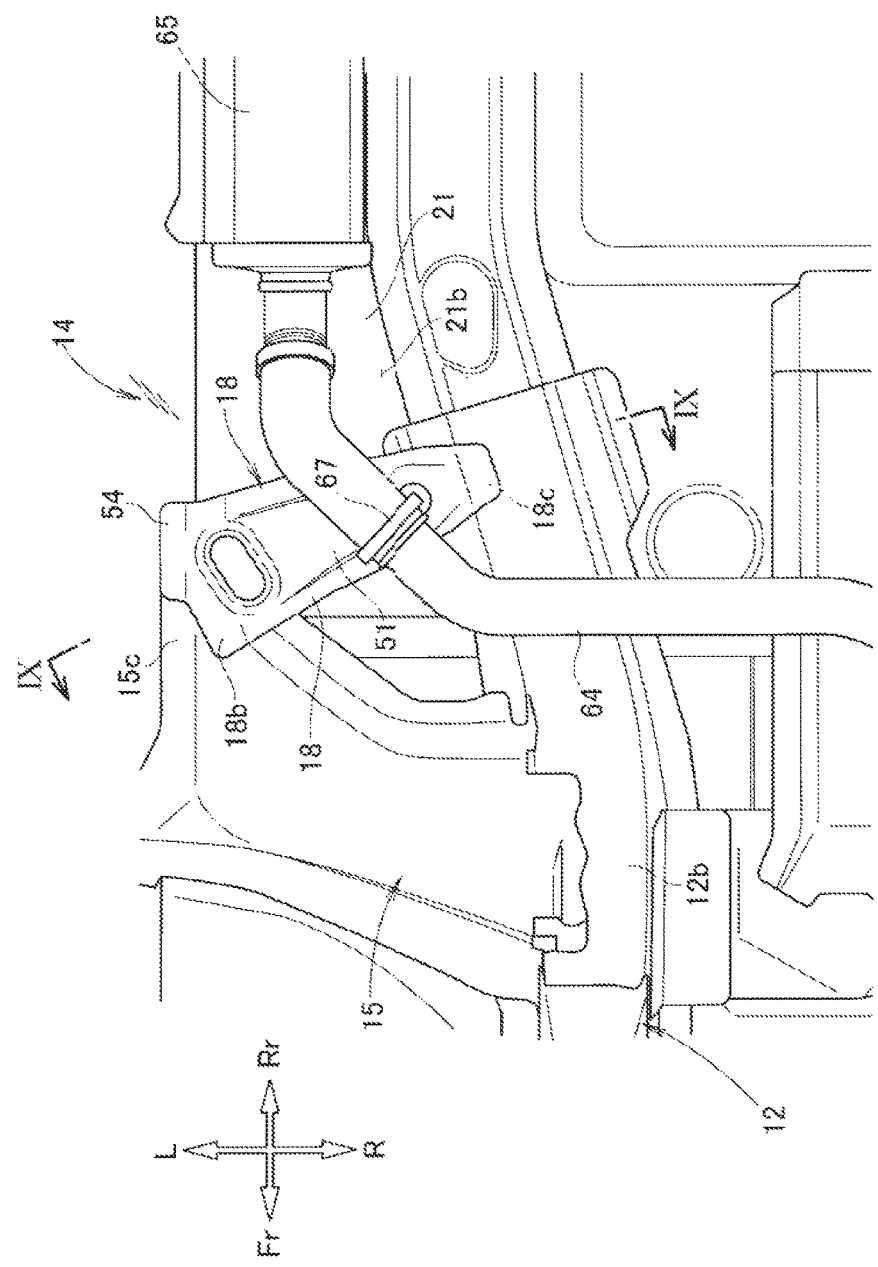
FIG. 8 is a bottom view of a reinforcing member of FIG. 4 at which a pipe is disposed.

As shown in FIGS. 8 and 9, the reinforcing member 18 is disposed on the side of the lower surface 21b of the floor panel 21, while the curved portion 51 of the reinforcing member 18 curves upward. A pipe (more specifically, an exhaust pipe) 64 is mounted on the curved portion 51 with a clip 67 therebetween. The pipe 64 is in communication with a muffler 65. The pipe 64 mounted on the curved portion 51 allows the exhaust pipe or the pipe 64 to be located closer to the floor panel 21 (namely, located higher). This enables the pipe 64 to be disposed higher, contributing to a reduction of the minimum ground clearance of the vehicle Ve.

The present application is typically described with reference to, but not limited to, the foregoing embodiment. Various modifications are conceivable within the scope of the present application. Although, in the embodiment described above, the reinforcing member 18 is joined to the lower surface 12c of the front side frame 12 and the lower surface 15b of the outrigger 15, both of which are components of the front assembly 31, the reinforcing member 18 may be joined to, for example, the upper surfaces (namely, the surfaces located on the side of the passenger compartment 41) of the front side frame 12 and the outrigger 15 of the front assembly 31.

In addition, although, in the embodiment described above, the reinforcing member 18 is joined to the lower surface 14b of the side sill 14 and the lower surface 21b of the floor panel 21 both of which are components of the floor assembly 32, the reinforcing member 18 may be joined to, for example, the upper surfaces (namely, the surfaces located on the side of the passenger compartment 41) of the side sill 14 and the floor panel 21 of the floor assembly 32.

Furthermore, although, in the embodiment described above, the slanted portion 36 is located adjacent to a rear end of the flat portion 35 so as to extend rearward, the slanted portion 36 may be located adjacent to, for example, a front end of the flat portion 35 so as to extend toward the front of the vehicle. Alternatively, the slanted portion 36 may be located adjacent to both the front and rear ends of the flat portion 35.

Although the curved portion 51 of the reinforcing member 18 curves upward in the embodiment described above, the curved portion 51 may be curved downward.

In addition, the shapes and configurations of the vehicle lower structure, the front side frame, the side sill, the outrigger, the floor frame, the reinforcing member, the floor panel, the stiffener, the front assembly, the floor assembly, the flat portion, the slanted portion, the folded portion, the seat portion, the curved portion, the projecting portion, the opening, and the pipe described above are not limited to those described in the embodiment and may be modified as appropriate.

For example, the embodiment of the present application can foe applied to a motor vehicle provided with a vehicle lower structure in which an outrigger extends from a front side frame to a side sill and in which a floor frame is coupled to the front side frame. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle lower structure comprising:
    a front side frame;
    a floor frame, wherein a front end of the floor frame is joined to a rear end of the front side frame;
    a side sill disposed on an outer side of the floor frame in a vehicle-width direction;
    an outrigger extending outward in the vehicle-width direction from the front side frame to a front end of the side sill;
    a reinforcing member extending obliquely rearward and inward in the vehicle-width direction from a junction area between the outrigger and the side sill to the front side frame,
    wherein the reinforcing member includes a bent portion bent upward at an intermediate position thereof,
    wherein the vehicle lower structure further comprises:
       a front assembly including the front side frame and the outrigger; and
       a floor assembly including the side sill, the floor frame, and a floor panel supported by the side sill and the floor frame, and
    wherein the reinforcing member is joined to lower surfaces of the front side frame and the outrigger of the front assembly, and is joined to lower surfaces of the side sill and the floor panel.

2. The vehicle lower structure according to claim 1, wherein the reinforcing member has a leading edge located toward the front of a vehicle and a trailing edge located toward the rear of the vehicle, and
    wherein the leading edge of the reinforcing member is inclined toward the front of the vehicle to a greater degree than that of the trailing edge.

3. The vehicle lower structure according to claim 1, wherein an outer end of the reinforcing member is located in the vicinity of a junction area between an outer end of the outrigger and the floor panel, and
    wherein the reinforcing member includes an opening in the vicinity of the outer end of the reinforcing member.

4. The vehicle lower structure according to claim 1, wherein the side sill includes a stiffener for reinforcement inside thereof, and wherein the reinforcing member has a projecting portion projecting to an area of the side sill located at the rear of the outrigger.

5. The vehicle lower structure according to claim 1, wherein the floor panel includes a planar flat portion, a slanted portion located adjacent to at least one of front and rear ends of the flat portion, a folded portion provided at the boundary between the flat portion and the slanted portion, and a seat portion that projects from the folded portion and to which the reinforcing member is joined.

6. The vehicle lower structure according to claim 1, wherein the reinforcing member is disposed under a lower surface of the floor panel, the bent portion bends upward and a pipe is disposed in the bent portion.

7. The vehicle lower structure according to claim 1, wherein the bent portion has a substantially V shape.

8. The vehicle lower structure according to claim 4, wherein the projecting portion, the side sill, and the stiffener are overlapped and joined to one another.

9. The vehicle lower structure according to claim 2, wherein the leading edge and the trailing edge of the reinforcing member are connected to a floor panel.

10. A vehicle comprising the vehicle lower structure according to claim 1.

11. The vehicle lower structure according to claim 1, wherein the front end of the floor frame is directly connected to the rear end of the front side frame.

12. The vehicle lower structure according to claim 1, wherein the outrigger is directly connected to the side sill.

13. The vehicle lower structure according to claim 1, wherein the front end of the floor frame is directly connected to the rear end of the front side frame via a first junction portion,
the outrigger is directly connected to the side sill via a second junction portion, and
the reinforcing member is connected to the first junction portion and the second junction portion.

* * * * *